(12) United States Patent  
Mockry

(10) Patent No.: US 10,132,569 B2  
(45) Date of Patent: Nov. 20, 2018

(54) HYBRID FLUID COOLER WITH EXTENDED INTERMEDIATE BASIN NOZZLES

(71) Applicant: SPX COOLING TECHNOLOGIES, INC., Overland Park, KS (US)

(72) Inventor: Eldon F. Mockry, Lenexa, KS (US)

(73) Assignee: SPX Technologies, Inc., Overland Park, KS (US)

(*) Notice: Subject to any disclaimer, the term of this patent is extended or adjusted under 35 U.S.C. 154(b) by 0 days.

(21) Appl. No.: 15/464,415

(22) Filed: Mar. 21, 2017

(65) Prior Publication Data

US 2018/0274863 A1 Sep. 27, 2018

(51) Int. Cl.
| | |
|---|---|
| *F25C 1/14* | (2018.01) |
| *F28C 1/14* | (2006.01) |
| *F28D 5/02* | (2006.01) |
| *F28F 25/04* | (2006.01) |
| *F28F 25/06* | (2006.01) |

(52) U.S. Cl.
CPC .......... *F28C 1/14* (2013.01); *F28D 5/02* (2013.01); *F28F 25/04* (2013.01); *F28F 25/06* (2013.01)

(58) Field of Classification Search
CPC .... F25B 41/04; F25B 2400/13; F25B 49/022; F24F 5/0035; Y02B 30/545; F28C 1/14; F28D 5/02; F28D 25/04; F28F 25/06
USPC ................ 62/117, 121, 259.4, 517
See application file for complete search history.

(56) References Cited

U.S. PATENT DOCUMENTS

| | | | | |
|---|---|---|---|---|
| 9,007,221 | B2* | 4/2015 | Zeighami | H05K 7/20781 340/605 |
| 2011/0100593 | A1* | 5/2011 | Benz | F28B 1/06 165/59 |
| 2012/0061055 | A1* | 3/2012 | Bugler, III | F28C 1/14 165/104.13 |
| 2014/0264974 | A1* | 9/2014 | Aaron | F28C 1/14 261/128 |

* cited by examiner

*Primary Examiner* — Melvin Jones  
(74) *Attorney, Agent, or Firm* — Baker & Hostetler LLP

(57) ABSTRACT

A hybrid fluid cooler or tower that provides enhanced cooler performance by improving air and water distribution to the indirect heat exchange section by utilizing extended flow nozzles.

20 Claims, 4 Drawing Sheets

US 10,132,569 B2

HYBRID FLUID COOLER WITH EXTENDED INTERMEDIATE BASIN NOZZLES

FIELD OF THE INVENTION

The present invention relates generally to cooling towers or fluid coolers, and more particularly relates in some aspects to a combination cooling apparatus that includes a closed loop coil heat exchanger section together with an evaporative water cooler section. The invention further pertains in other aspects to extended intermediate basin nozzles.

BACKGROUND OF THE INVENTION

Many cooling devices are in wide use industry. Some of these devices are referred to as "fluid coolers" and are used to cool and return fluid from devices such as water source heat pumps, chillers, cooling jackets, or other systems that produce relatively hot fluid and require the return of relatively cooler fluid. Such cooling devices include different types such as closed looped systems, which often feature a serpentine heat exchange coil, and open loop or evaporative systems, which pass the water through fill media such as a sheet pack or over a series of splash bars before collecting the water in a basin.

Arrangements currently employed in the art combine these two features. These arrangements or designs provide a high efficiency, induced draft, combination counter-flow-crossflow fluid cooling apparatus and method which gives a unexpectedly enhanced cooling of hot fluid by causing the fluid to pass upwardly through a series of serpentine heat exchange conduits in primarily countercurrent, indirect sensible heat exchange relationship with external cooling water gravitating from an overlying evaporative water cooling section. Crossflowing air currents are pulled through the apparatus to evaporatively cool the water not only in the upper cooling section but also in the sensible heat exchange area as well. Countercurrent flow of coolant water and fluid to be collected ensures that the coldest water and coldest fluid are in thermal interchange during the final stages of fluid cooling at the upper ends of the heat exchange conduits, so that the fluid temperature can approach that of the cold water as opposed to approaching the temperature of heated water found adjacent the lower ends of the conduits, which is conventional in cocurrent fluid units of this type. The fluid conduit system is preferably arranged for causing increased fluid residence time, and thereby greatest temperature difference and longer heat exchange between the fluid and coolant water, so that an ideal countercurrent flow relationship is obtained and maximum heat transfer is assured. An underlying water collection basin is also employed in the apparatus which is constructed to permit collection of cooling water to a level above that of the lowermost portions of the hot fluid conduits, in order to allow the hot fluid traveling through the conduits to heat the collected water to prevent freezing thereof during wintertime operations when the internal water pump is shut down causing the stoppage of the evaporative cooling and hence a raising of the lower water basin level.

The above described systems, while providing excellent performance, can still be improved upon.

It is sometimes desirable to improve the air and water distribution over the coils of the indirect cooling section for better thermal performance of cooling towers or hybrid fluid coolers. Accordingly, it would be desirable to provide a fluid cooler design wherein the air entering the coils, for example, would avoid the spray of cooling liquid at the outboard nozzle location. This likely will improve the liquid distribution at the outboard portion of the coil while avoiding the potential pressure drop associated with the air flow traveling through the spray liquid.

In view of the foregoing, it would be desirable to have a fluid cooler or tower that provides enhanced cooling performance by improving air and water distribution to the indirect heat exchange section.

SUMMARY OF THE INVENTION

The foregoing needs are met, to a great extent, by the present invention, wherein in one aspect an apparatus is provided that in some embodiments provides enhanced thermal performance.

In one aspect of the present invention, a hybrid fluid cooler that extends along a longitudinal axis is provided, comprising; a direct heat exchange section; an indirect heat exchange section; a first liquid distribution assembly located at a first position along the longitudinal axis adjacently above the direct heat exchange section wherein said first liquid distribution assembly comprises: a first liquid distribution basin a first dry plenum that extends a first plenum distance from the first basin; a first wet plenum that extends from the first dry plenum to the direct heat exchange section; and a first nozzle, wherein said first nozzle is connected to said first liquid distribution assembly and extends therefrom through the first dry plenum and the second wet plenum; a second liquid distribution assembly located at a second position along the longitudinal axis adjacently below the direct heat exchange section and oriented adjacently above the indirect heat exchange section wherein said second liquid distribution assembly comprises: a second liquid distribution basin; a second dry plenum that extends a second plenum distance from the second distribution basin, wherein said second plenum distance is greater than said first plenum distance; and a second wet plenum that extends from the second dry plenum to the indirect heat exchange section; and a second nozzle, wherein said second nozzle is connected to said second liquid distribution assembly and extends therefrom through the second dry plenum and the second wet plenum and a lower collection basin.

In yet another aspect of the present invention, a hybrid fluid cooler that extends along a longitudinal axis provided, comprising; a direct heat exchange section; an indirect heat exchange section; a first liquid distribution assembly located at a first position along the longitudinal axis wherein said first liquid distribution assembly comprises: a first liquid distribution basin; a first dry plenum that extends a first plenum distance from the first basin; a first wet plenum that extends from the first dry plenum to the direct heat exchange section; and a first nozzle, wherein said first nozzle is connected to said first liquid distribution assembly and extends therefrom through the first dry plenum and the second wet plenum; a second liquid distribution assembly located at a second position along the longitudinal axis, wherein said second position is vertically above said first position and wherein said second liquid distribution assembly comprises: a second liquid distribution basin; a second dry plenum that extends a second plenum distance from the second distribution basin; and a second wet plenum that extends from the second dry plenum; and a second nozzle, wherein said second nozzle is connected to said second liquid distribution assembly and extends therefrom through the second dry plenum and the second wet plenum; and a lower collection basin, wherein said second plenum distance is greater than said first plenum distance.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

In various embodiments, a hybrid fluid cooler is provided that provides improved air and water distribution to the heat exchange coil allowing for improved thermal performance of the hybrid fluid cooler.

Figure 1:
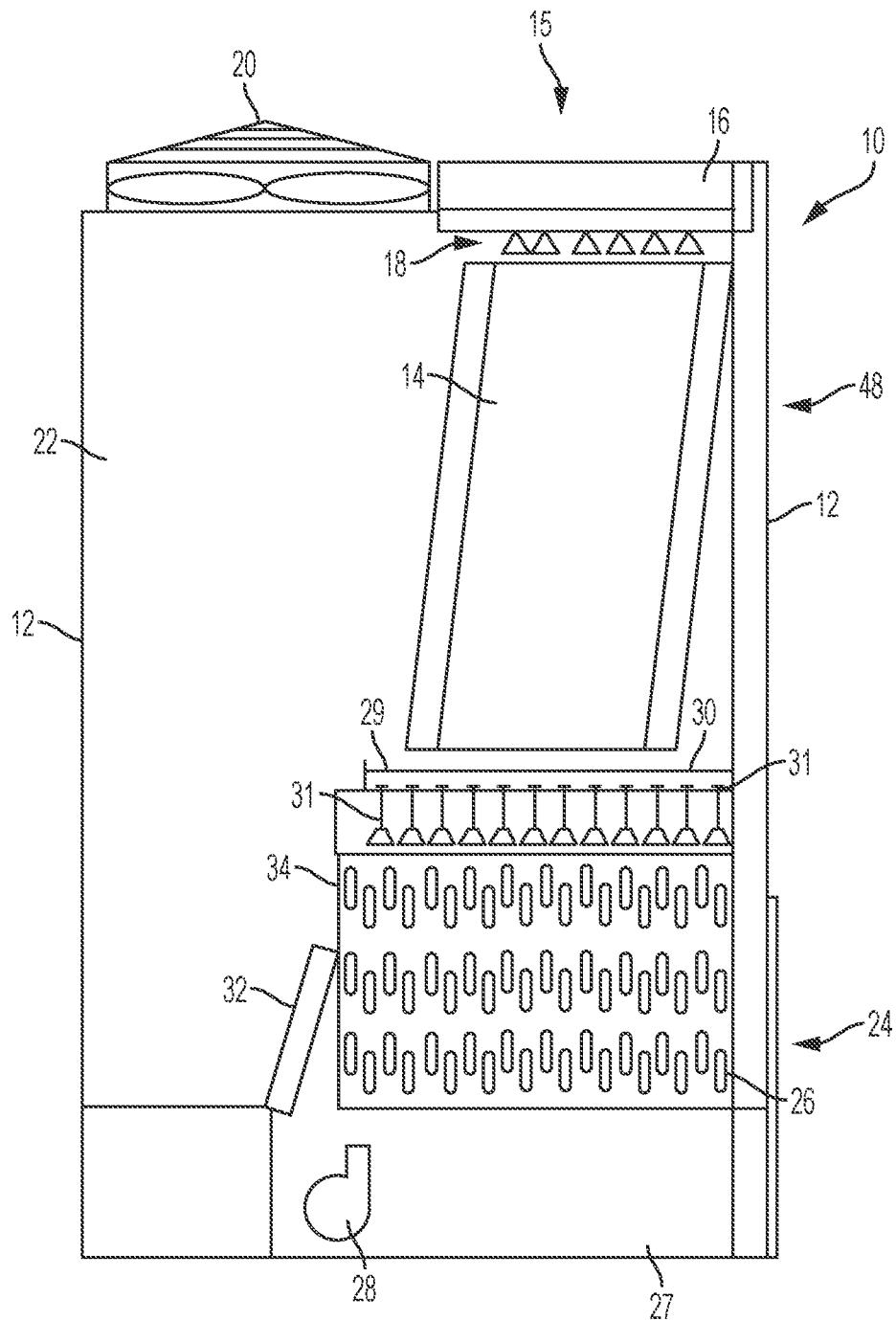
FIG. 1 is a side, schematic view of a hybrid fluid cooler according to a preferred embodiment of the present invention.

Some preferred embodiments of the invention will now be described with reference to the drawing figures, in which like reference numerals refer to like elements throughout. Turning to FIG. 1, a hybrid fluid cooler is depicted, generally designated 10. The hybrid fluid cooler 10 has a framing structure or cabinet 12. The frame or cabinet 12 encloses the internals of the hybrid fluid cooler 10. The hybrid fluid cooler 10 comprises an upper, direct heat exchange section 14. This upper, direct heat exchange section 14 is preferably fill media or material 14 that is an evaporative fill material. In one embodiment of the present invention, it is a film type fill pack comprised of a number of thin fill sheets, with each fill sheet having features and or geometries such as for example ribs, tortuous paths, spacers, and/or integral louvers and eliminators.

As illustrated in FIG. 1, the hybrid fluid cooler 10 includes an upper distribution assembly 15 having a distribution basin 16 that is positioned vertically adjacent the direct heat exchange section 14. The upper distribution basin 16 has distribution nozzles 18 which function to spray cooling liquid, e.g., water onto and through the upper fill material 14. Said nozzles 18 may be of any size and geometry that evenly and consistently disperses the cooling liquid over the direct heat exchange section 14.

The hybrid fluid cooler 10 also includes an air current generator 20, for example, a fan assembly that is positioned adjacent or next to the upper distribution assembly or liquid distributor 16. The distribution assembly 16 may comprise a pressurized spray system having conduits and nozzles or alternatively, it may include a distribution basin and nozzles. The fan assembly 20 is also located above the hybrid fluid cooler plenum 22 which extends within the frame or cabinet 12 of the hybrid fluid cooler 10.

As illustrated in FIG. 1, the hybrid fluid cooler 10 includes a lower, indirect heat exchange section generally designated 24. In an embodiment of the present invention, the lower indirect heat exchange section 24 is a serpentine heat exchanger arrangement. More specifically, it is preferably a closed loop, fluid cooling arrangement such as for example a parallel system having a number of parallel horizontal circuits 26 arranged in vertical coil rows. In one embodiment, each circuit starts at the bottom of the fluid cooler 10. The conduits travel back and forth through the straight sections, parallel and horizontally adjacent to one another, moving upward through U-bends at the ends of the straight tube sections via the serpentine arrangement. The coils may be useful to cool any fluids, but may be typically used to cool water, water/glycol mixtures, oil or other fluids, particularly those compatible with metal alloys, which is one preferred material for fabrication of the coils.

The lower heat exchange section 24 includes a pump 28 that pumps circulating cooling water through a vertical supply tube (not pictured) and into the upper distribution basin 16. As previously described, the upper distribution basin 16 has distribution nozzles 18 which spray cool water onto and through the upper fill material of the direct heat exchange section 14. The cooling water, which is relatively warm at this point, has its temperature reduced by passing through the fill material of the direct heat exchange section 14, due to a number of effects including contact with air and evaporation. This water, which is now relatively cooler, drops from the bottom of the upper direct heat exchange section 14 into a basin 29 of an intermediate water distribution assembly 30. As illustrated in FIG. 1, the intermediate water basin 29 is positioned adjacently below the direct heat exchange section 14, at the bottom of the fill sheets. The intermediate water distribution assembly 30 includes a series of long barrel or stem nozzles 31. The long barrel or stem nozzles 31 will be described in further detail below.

The intermediate water distribution assembly 30 may accomplish one or more of several functions, including for example: collecting the cooling water; evenly redistributing the cooling water onto the lower heat exchanger 24; and/or providing an air baffle to separate the air flow passing through the upper fill material 14 from the air flow passing through the lower heat exchanger 24.

The cooling water which is distributed by the intermediate water distribution assembly 30 next passes over the lower heat exchanger 24 and over the tube coils 26, thereby cooling the fluid being cooled by the lower heat exchanger 24. The cooling water, after it passes through the lower heat exchanger 24, then falls into a lower collection basin 27, from which it is recirculated by the pump 28 back up through the supply tube (not pictured) and into the upper distribution basin 16.

As previously mentioned, the hybrid fluid cooler 10 employs a fan assembly 20 for generating airflow through the hybrid fluid cooler 10. While a single fan assembly is depicted, such hybrid fluid coolers may typically have one, two or three fans to move air. In the illustrated embodiment, the fan assembly 20 is oriented at the top of the hybrid fluid cooler 10 to provide a cross-flow air draw over both the upper direct heat exchange section 14 and generally co-current air flow through the lower indirect heat exchange section 24 as will be described in more detail below. A drift eliminator 32 and sidewall barrier 34 are provided on the interior adjacent the side of the lower indirect heat exchange section 24 and will be described in further detail below.

Figure 2:
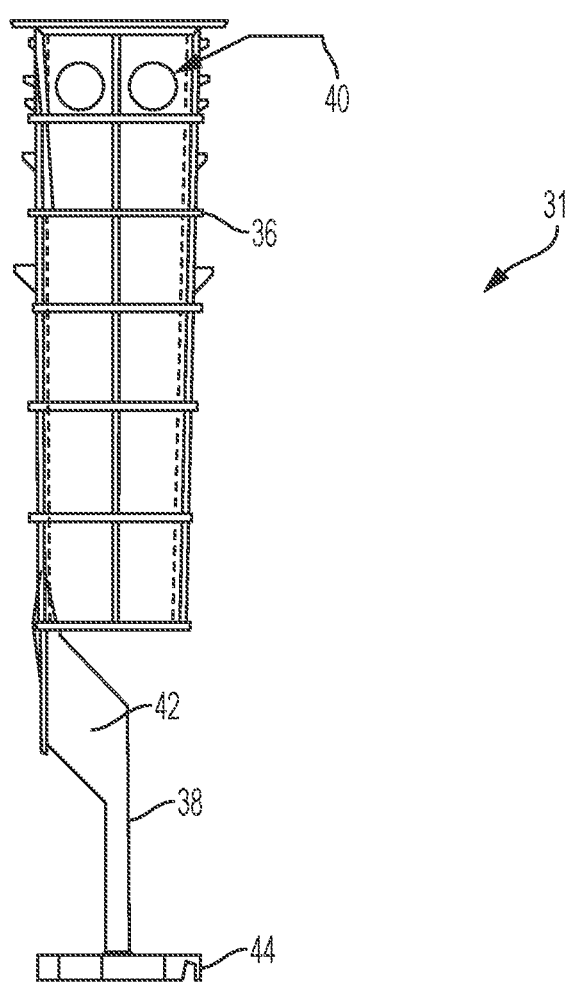
FIG. 2 is a side, schematic view of a spray nozzle in accordance with an embodiment of the present invention.

Turning now to FIG. 2, a long barrel nozzle 31 is depicted in detail. As illustrated in FIG. 2, the nozzle has an upper, flow portion or barrel 36 and a lower, spray or dispersing section 38. As illustrated, the upper flow portion 36 is preferably circular in geometry in one embodiment of the present invention however this shape or geometry, e.g., barrel, may vary depending up application, e.g., rectangular. The flow portion 36 also includes vent orifices 40 that assist with the flow of fluid and prevent the likelihood of a syphon effect. The vent orifices 40 are positioned at the upper end of the flow portion 36. While two vent orifices 40 are depicted, more or less vent orifices may be utilized depending upon need or application.

Turning to the lower, spray section 38, it extends from the lower end of the flow portion 36. The lower, spray section 38 includes a shaft or arm 42 that attaches to the lower end of the flow portion 36, and extends downward away from said end to a dispersing or spray target 44. The spray component 44 functions to spray or disperse the cooling fluid evenly over the indirect heat exchange section 24. The spray component 44 may have varying sizes, shapes and geometries.

The upper flow section 36 and lower spray section 38 combine to provide an extended nozzle 31. While the nozzle 31 may vary in length depending upon hybrid fluid cooler 10 size, in one preferred embodiment of the present invention the nozzle has a length of approximately 10 inches (10").

Figure 3:
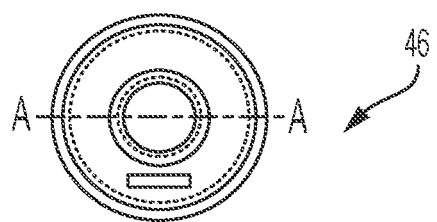
FIG. 3 is a top view of a nozzle orifice insert to the spray nozzle illustrated in FIG. 2.
Figure 4:
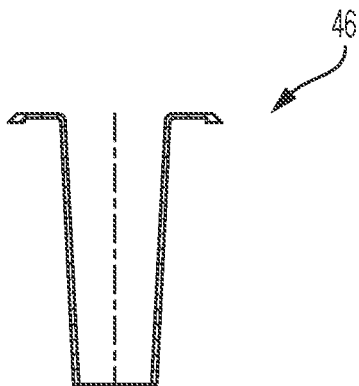
FIG. 4 is a sectional view taken along line A-A of the spray nozzle orifice insert illustrated in FIG. 3.

Turning now to FIGS. 3 and 4, an orifice insert, generally designated 46, is illustrated that is used in combination with the nozzle 31. Whereas FIG. 3 is a top view, FIG. 4 is a side, sectional view along line A-A of FIG. 3. The orifice insert 46 is separate from the nozzle 31 and snaps into the top of the nozzle 31. The orifice insert 46 may vary in size to meter desired water flows.

The hybrid fluid cooler 10 has a space or spacing between the bottom of the intermediate basin 30 and the top of the indirect heat exchange section 24. This spacing can range in magnitude and in one embodiment, can range from ten inches (10") to twenty-four inches (24") or more, and preferably can be seventeen inches (17"). The use of the nozzles 31 assist to create a dry plenum zone to permit air entry to the indirect heat exchanger 24, minimizing the pressure drop of the spray droplets and reducing the amount of water "pull back" from the inlet face. More specifically, the nozzles 31 improve air and water distribution to the indirect heat exchange section 24 for better thermal performance. This is achieved by at least a portion of the air entering the coils 26 of the indirect section 24 avoiding the spray of the outermost nozzles 31. This helps reduce the likelihood of pull back which improves the water distribution at the outermost portion of the coils 24. It also helps to avoid the pressure drop associated with the air traveling though the portion of the spray.

Turning now to the operation of the fluid cooler 10, the fan assembly 20 provides a pressure differential drawing air upward and out of the cooling tower. Thus, in the upper portion of the hybrid fluid cooler 10, air is drawn into an air inlet 48 and passes across the upper fill media 14, before exiting the fill media 14 and being drawn upward and outward from the hybrid fluid cooler 10. The relatively warm cooling water which is pumped into the upper water distribution system 16, exits through nozzles 18 and falls over the upper evaporative fill pack 14, is cooled as it travels there through, and is collected in the intermediate water distribution assembly 30.

As noted above, the intermediate water distribution assembly 30 has the extending nozzles 31 evenly arranged thereon and therefore is able to provide even water volume distribution over the lower indirect exchanger 24. As previously described, the use of the nozzles 31 assists to create a dry plenum zone to permit air entry to the indirect heat exchanger 24, minimizing the pressure drop of the spray droplets and reducing the amount of water "pull back" from the inlet face. More specifically, the nozzles 31 improve air and water distribution to the indirect heat exchange section 24 for better thermal performance.

The relatively cool cooling water after it is distributed by the intermediate water distribution assembly 30 passes over the lower heat exchange section 24, picking up heat and evaporatively exchanging heat to air while doing so, and falls into the lower collection basin 27, from which it is recirculated by the pump.

The intermediate water distribution assembly 30 performs a further function of separating the two major air flows of the hybrid fluid cooler 10. That is, the intermediate distribution assembly 30 separates the upper air flow, which is passing across the upper fill material 14 from the lower air flow which is passing over the lower heat exchanger 24.

The lower heat exchanger 24 has at its air outlet side a side wall barrier or baffle 34, and a drift eliminator 32 disposed in the angled orientation generally shown in FIG. 1. The drift eliminator 32 can be described as having a major flow axis across its width, which, in the illustrated embodiment is tilted relative to horizontal as described below by tilting the drift eliminator 32. The eliminator 32 exits air at an upward angle compared to its major flow axis at an upward angle of 10 to 60 degrees and more preferably 30 degrees. This provides several advantageous benefits, including causing the air to not only have co-current flow through the coils but also having a somewhat crossflow component. The bottom of the coils 26 of the lower heater exchanger 24, are spaced above the lower basin 30 so that some air can pass thereunder and then upward through the drift eliminator 32. It has been found that positioning the drift eliminator 32 at an angle of at approximately 15 to 45 degrees from vertical, and more preferably 30 degrees, can be very advantageous in this exemplary type of arrangement. The air is then turned by the overall tilt angle, and is further turned by the additional exit air angle of the drift eliminator 32. At this angle the direction the air leaves the eliminator and is directed towards the fan/s providing the least amount of air turning loss. In particular, the angled orientation of the eliminator helps "turn" the air flow separately so that it does not "crash" into the back wall. This lower pressure drop resulting from the eliminator turning device lowers the overall system pressure drop and hence the fan power needed.

Figure 5:
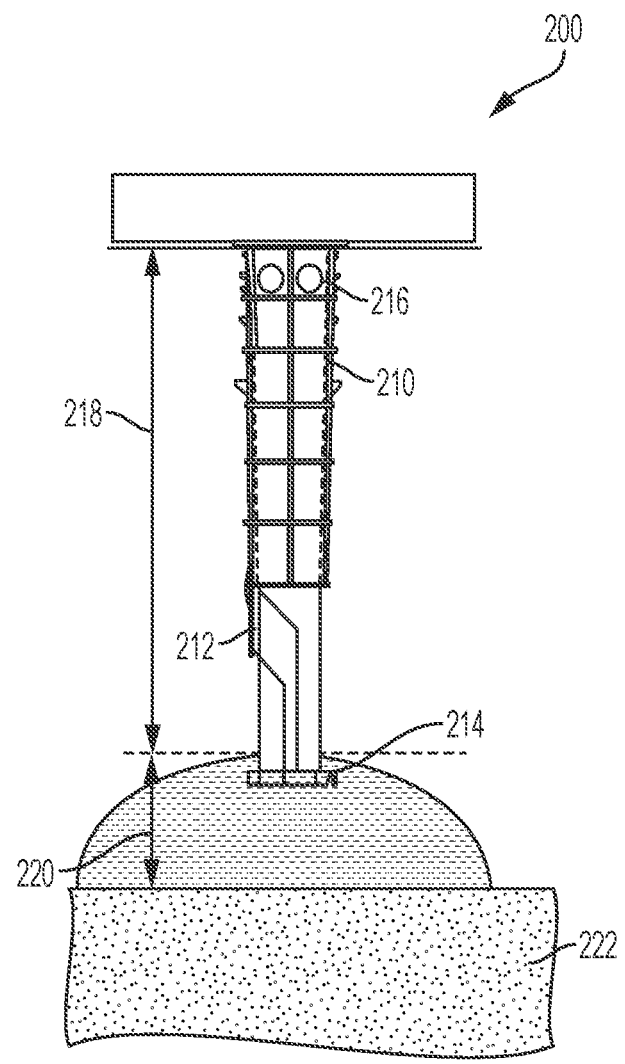
FIG. 5 is a side schematic view of a spray nozzle in accordance with an embodiment of the present invention.

Turning now to FIG. 5, an extended spray nozzle, generally designated 200, is depicted during the operation of the hybrid cooling tower (not pictured). As illustrated, the spray nozzle includes a barrel portion 210, a shaft portion 212 extending therefrom, and a target 214 connected to said shaft 212. The barrel portion 210 is vented by a pair of vents 216.

As illustrated, the nozzle 200 extends through a dry plenum area or zone 218 and ceases at a wet plenum area or zone 220 at the target 214. In one embodiment of the present invention, the dry plenum 218 is approximately the length of the nozzle 200. The wet plenum extends from the target 214 to the heat exchange section 222.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A hybrid fluid cooler that extends along a longitudinal axis, comprising;
    a direct heat exchange section;
    an indirect heat exchange section;
    a first liquid distribution assembly located at a first position along the longitudinal axis adjacently above the direct heat exchange section wherein said first liquid distribution assembly comprises:
        a liquid distributor;
        a first dry plenum that extends a first plenum distance from the liquid distributor;
        a first wet plenum that extends from the first dry plenum to the direct heat exchange section; and
        a first nozzle, wherein said first nozzle is connected to said first liquid distribution assembly and extends therefrom through the first dry plenum and the second wet plenum;
    a second liquid distribution assembly located at a second position along the longitudinal axis adjacently below the direct heat exchange section and oriented adjacently above the indirect heat exchange section wherein said second liquid distribution assembly comprises:
        a liquid distribution basin;
        a second dry plenum that extends a second plenum distance from the liquid distribution basin, wherein said second plenum distance is greater than said first plenum distance; and
        a second wet plenum that extends from the second dry plenum to the indirect heat exchange section; and
        a second nozzle, wherein said second nozzle is connected to said second liquid distribution assembly and extends therefrom through the second dry plenum and the second wet plenum
    a lower collection basin.

2. The hybrid fluid cooler according to claim 1, wherein said direct heat exchange section is evaporative fill media.

3. The hybrid fluid cooler according to claim 2, wherein said indirect heat exchange section comprises heat exchange conduits.

4. The hybrid fluid cooler according to claim 1, wherein said liquid distribution basin collects liquid from the direct heat exchange section and redistributes the liquid onto said indirect heat exchange section.

5. The hybrid fluid cooler according to claim 1, wherein first nozzle comprises:
    a first barrel section;
    a first shaft extending from said first barrel section; and
    a first target connected to said first shaft.

6. The hybrid fluid cooler according to claim 5, wherein said second nozzle comprises:
    a second barrel section;
    a second shaft extending from said second barrel section; and
    a second target connected to said first shaft.

7. The hybrid fluid cooler according to claim 6, wherein said second barrel section is vented.

8. The hybrid fluid cooler according to claim 1, wherein the liquid distributor comprises a basin.

9. The hybrid fluid cooler according to claim 6 wherein each of said first and second barrel sections comprises a liquid flow insert.

10. The hybrid fluid cooler according to claim 1, wherein said second plenum distance is approximately ten (10) inches.

11. A hybrid fluid cooler that extends along a longitudinal axis, comprising;
    a direct heat exchange section;
    an indirect heat exchange section;
    a first liquid distribution assembly located at a first position along the longitudinal axis wherein said first liquid distribution assembly comprises:
        a liquid distributor;
        a first dry plenum that extends a first plenum distance from the liquid distributor;
        a first wet plenum that extends from the first dry plenum to the direct heat exchange section; and
        a first nozzle, wherein said first nozzle is connected to said first liquid distribution assembly and extends therefrom through the first dry plenum and the first wet plenum;
    a second liquid distribution assembly located at a second position along the longitudinal axis, wherein said second position is vertically above said first position and wherein said second liquid distribution assembly comprises:
        a second liquid distribution basin;
        a second dry plenum that extends a second plenum distance from the second liquid distribution basin; and
        a second wet plenum that extends from the second dry plenum; and
        a second nozzle, wherein said second nozzle is connected to said second liquid distribution assembly and extends therefrom through the second dry plenum and the second wet plenum; and
    a lower collection basin,
    wherein said second plenum distance is greater than said first plenum distance.

12. The hybrid fluid cooler according to claim 11, wherein said direct heat exchange section is evaporative fill media.

13. The hybrid fluid cooler according to claim 12, wherein said indirect heat exchange section comprises heat exchange conduits.

14. The hybrid fluid cooler according to claim 11, wherein said first liquid distribution assembly collects liquid from the indirect heat exchange section and redistributes the liquid onto said direct heat exchange section.

15. The hybrid fluid cooler according to claim 11, wherein first nozzle comprises:
    a first barrel section;
    a first shaft extending from said first barrel section; and
    a first target connected to said first shaft.

16. The hybrid fluid cooler according to claim 15, wherein said second nozzle comprises:
    a second barrel section;

a second shaft extending from said second barrel section; and a second target connected to said first shaft.

17. The hybrid fluid cooler according to claim 16, wherein said second barrel section is vented.

18. The hybrid fluid cooler according to claim 17, wherein the liquid distributor comprises a basin.

19. The hybrid fluid cooler according to claim 11, wherein said second plenum distance is approximately ten (10) inches.

20. The hybrid fluid cooler according to claim 16, wherein each of said first and second barrel sections comprises a liquid flow insert.

* * * * *